(12) United States Patent
Tong et al.

(10) Patent No.: US 11,886,340 B1
(45) Date of Patent: Jan. 30, 2024

(54) REAL-TIME PROCESSING IN COMPUTER SYSTEMS

(71) Applicant: Apple Inc., Cupertino, CA (US)

(72) Inventors: Jonathan Y. Tong, Austin, TX (US); David E. Kroesche, Austin, TX (US); Brett S. Feero, Lake Oswego, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/818,660

(22) Filed: Aug. 9, 2022

(51) Int. Cl.
*G06F 12/08* (2016.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0656* (2013.01); *G06F 3/0679* (2013.01); *G06F 2212/60* (2013.01)

(58) Field of Classification Search
CPC .. G06F 12/0802; G06F 3/0604; G06F 3/0656; G06F 3/0679; G06F 2212/60
See application file for complete search history.

(56) References Cited

U.S. PATENT DOCUMENTS

| 7,231,499 B2 | 6/2007 | Chen |
| 2005/0144401 A1 | 6/2005 | Pantalone et al. |
| 2009/0037609 A1* | 2/2009 | Riley ............. G06F 3/0227 710/10 |
| 2012/0072677 A1 | 3/2012 | Biswas et al. |

* cited by examiner

*Primary Examiner* — Jae U Yu
(74) *Attorney, Agent, or Firm* — Kowert, Hood, Munyon, Rankin & Goetzel, P.C.; Erik A. Heter; Dean M. Munyon

(57) ABSTRACT

A processor configured for real-time transaction processing is disclosed. A processor circuit includes configuration registers that designate a first range of physical memory addresses as reserved for real-time memory requests and a second, non-overlapping range of physical memory addresses that are shared between real-time and non-real-time memory requests. In response to determining that a memory request is associated with an address in the first range, the processor tags the request as a real-time request. The configuration registers may also store information designating portions of one or more cache memories and one or more buffers as being reserved for real-time memory requests. During arbitration, real-time memory requests are given priority over older, non-real-time memory requests.

20 Claims, 8 Drawing Sheets

REAL-TIME PROCESSING IN COMPUTER SYSTEMS

BACKGROUND

Technical Field

This disclosure is directed to processor circuits, and more particularly, to prioritizing traffic in processors.

Description of the Related Art

One type of integrated circuit (IC) that has increased in use in recent years is the system-on-a-chip (SoC). SoCs are used in many devices, including portable consumer and computing devices. The increased use of SoCs has been in part driven by the decrease in size of many devices coupled with the increased demand for additional functionality.

Many SoCs have a wide variety of functional circuits implemented thereon. For example, an SoC may include one or more general purpose processor cores, various memory controllers, graphics processing circuitry, and peripheral interfaces. Additional processors may be implemented as part of the peripheral interfaces to carry out certain control functions. SoCs also typically include various types of circuits for conveying communications traffics between other functional circuits. For example, an SoC may include a communications traffic that may include circuits such as crossbar switches along with various transmitter and receiver circuits. Furthermore, SoCs may also implement quality of service (QoS) functionality that allows the prioritization of some types of traffic over other types.

SUMMARY

A processor circuit arranged for real-time processing is disclosed. In one embodiment, a processor circuit includes a load-store circuit, one or more buffers, and one or more configuration registers. The load-store circuit performs loads of data from a memory as well as stores of data to one or more memories coupled to the processor. The one or more buffers are configured to store memory requests (loads and stores) for transmission to the one or more memories. The one or more configuration registers store information indicative of a first range of physical addresses in the one or more memories reserved for real-time memory requests. A second, non-overlapping range of physical addresses may be shared between real-time and non-real-time memory requests. The configuration registers also indicate portion of the one or more buffers reserved for real-time memory requests. The processor circuit is configured to tag a memory request as a real-time memory request in response to determining that a physical address of the request falls within the first range of physical addresses.

In one embodiment, the processor circuit is an auxiliary processor implemented on a system-on-a-chip (SoC) as part of an interface circuit. The SoC may also include one or more general-purpose processors, at least one memory controller (with memory interface circuitry), and a communications fabric including communications circuitry (e.g., a crossbar switch or other types of on-chip network circuitry). The processor circuit of the disclosure may convey real-time and non-real-time memory requests to, e.g., the memory controller, via the communications fabric.

BRIEF DESCRIPTION OF THE DRAWINGS

The following detailed description makes reference to the accompanying drawings, which are now briefly described.

DETAILED DESCRIPTION OF EMBODIMENTS

Figure 1:
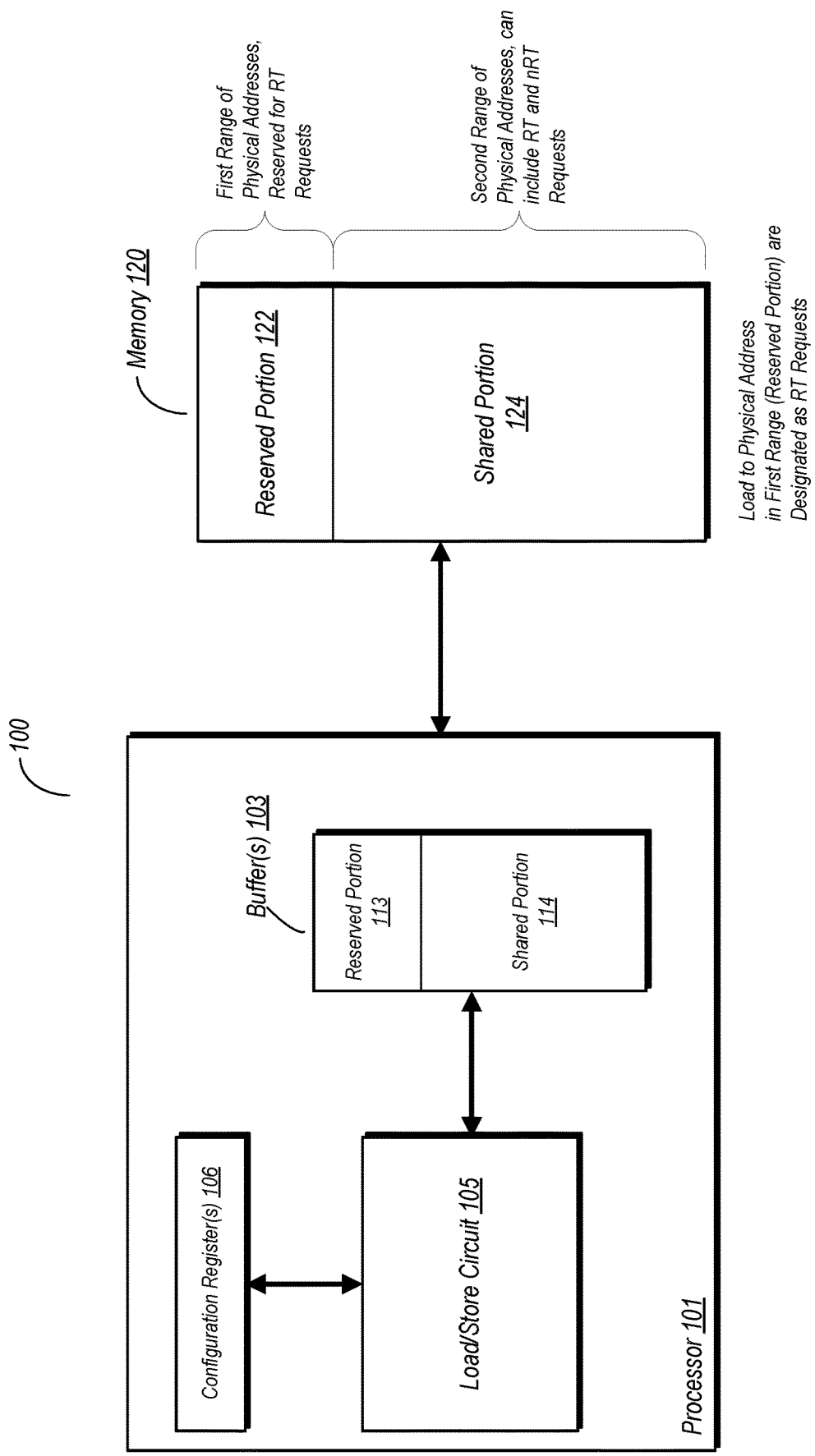
FIG. 1 is a block diagram of one embodiment of a system including a processor and a memory.

Many modern SoCs include a number of different processors implemented on a single integrated circuit. An SoC may include a number of general purpose processors, graphics processors, and may also include various auxiliary processors that are, e.g., part of various peripheral interfaces. These auxiliary processors may carry out various functions for their respective interfaces and any peripheral devices connected thereto. In carrying out these functions, the auxiliary processors may exchange traffic with system memory and various caches implemented on the SoC. Such functions may include interrupt handling as well as other types of functions that involve types of memory traffic having different quality of service (QoS) requirements.

With regard to interrupts handled by an auxiliary processor, certain latency requirements may apply. In some systems, these requirements may include designating certain types of memory traffic and memory access requests as real-time (RT) traffic, while other types may be designated as non-real-time (NRT) traffic, the latter of which has less restrictive latency requirements than the former. Memory traffic associated with interrupts (e.g., fetching interrupt handlers and associated data) may in many cases be designated as RT traffic. Other types of memory traffic may also be designated as RT traffic if there are certain latency requirements associated therewith. With respect to interrupts, processor response time (time required for a processor to respond to the interrupt) and handler execution time (the time required for processor to execute the interrupt handler) may need to be handled within a guaranteed time (e.g., a certain number of cycles). Some processors may thus deal with these latency requirements by adding duplicate structures, such as separate memories that are designated to RT and NRT memory requests. Such processors may also add attributes in a page table that can be used to distinguish memory traffic and request types. However, these solutions can add significant hardware complexity to processors, particularly to those that are primarily designated for auxiliary functions, such as those associated with a peripheral interface. This complexity can also compete with resources and area on an SoC, which may be at a premium.

The present disclosure makes use of the insight that, instead of using duplicate structures with a hard partition and added complexity, certain, programmable ranges of memory addresses may be designated as reserved for RT memory traffic/requests (or more generally, RT transactions). Accordingly, the present disclosure contemplates providing defined RT apertures (programmable memory [physical] address ranges) that are dedicated to RT memory requests (e.g., for interrupts with RT processing requirements). Loads to addresses within the RT aperture are considered RT transactions, loads to other addresses may be considered as NRT unless otherwise designated as RT. Buffers in the cache hierarchy may also be dedicated to RT loads to allow progress to be made even if a number of NRT loads are queued. An arbitration policy may also be changed to allow the advancement of RT loads ahead of NRT loads, even if the latter are older.

The present disclosure also contemplates a downgrade mechanism to render some RT requests as uncacheable/no-allocate to a particular cache (e.g., L1D) in particular instances. This is due to, for example, the possibility of a potential victim line in the cache being a dirty cache line. Since the dirty cache line requires writeback to memory prior to eviction, the replacement could potentially delay the RT request causing the eviction. In such instances, the RT request may be designated as uncacheable in a particular cache, but may be cacheable in a lower-level cache when space is available.

As noted above, some resources, such as particular ranges of physical memory addresses, may be reserved for RT memory transactions. The non-reserved portions may be shared by both RT and NRT transactions. In some embodiments, the processor and various components thereof may first utilize space in the shared portions of the various resources, and use the reserved portions of the resources for RT transactions when space is unavailable in the shared portions. It is further noted that memory transactions that are associated with one of the reserved physical memory addresses may be designated by the processor as RT transactions if not done so prior to being initiated.

As a result of the above, the various embodiments allow software, such as interrupt service routines, to distinguish between RT and NRT transactions and to thus allow hardware to deliver the desired QoS. This is implemented without the complexities of processors in which separate, hard partitions are formed based on the use of separate, duplicate resources for RT and NRT transactions.

Various embodiments are now discussed in further detail. The discussion begins with example systems in which resources are reserved for RT transactions, while unreserved resources may be shared between RT and NRT transactions. A portion of a processor used in carrying out certain functions in handing transactions with differing QoS requirements is also discussed. A description of an SoC embodiment in which a processor according to this disclosure is also provided. Thereafter, various method embodiments are described. The discussion concludes with a description of an example system in which the disclosed apparatus and method embodiments may be implemented.

System with Reserved RT Resources:

FIG. 1 is a block diagram of one embodiment of a system including a processor and a memory. In the embodiment shown, system 100 includes processor 101 and a memory 120. Processor 101 may be one of a number of different types of processors. In an embodiment to be discussed in further detail below, processor 101 may be an auxiliary processor that is implemented in a system or on an SoC for performing certain functions separate from those provided by general-purpose processors. For example, processor 101 may be an auxiliary processor that is implemented as part of a peripheral interface to perform various control functions associated therewith. Other applications for processor 101 are possible and contemplated, including its use in embedded systems and the like.

Processor 101 in the embodiment shown includes a load/store circuit 105, a set of configuration registers 106, and a set of buffers 103. Although not explicitly shown here, processor 101 may also include a memory controller having a physical interface for facilitating communications with memory 120, which may be one of one or more system memories.

Load/store circuit 105 in the embodiment shown is configured to execute instructions to perform loads of data from memory 120, as well as stores of data thereto. Configuration registers 106 in the embodiment shown are configured to store various types of system configuration information related to the operations carried out by processor 101. This information includes ranges of memory addresses and particular portions of resources that are reserved for RT memory requests (and more generally, transactions) as well as portions of the resources that may be shared by RT and NRT memory requests. Generally speaking, RT memory requests may have stricter latency requirements than NRT memory requests. Thus, these requests may be handled differently from one another, with certain resources reserved for the RT memory requests.

As shown in FIG. 1, buffers 103 include a reserved portion 113 and a shared portion 114. Similarly, memory 120 includes a reserved portion 122 and a shared portion 124. Configuration registers 106 in the embodiment shown may store information indicative of a range of physical addresses that are reserved for RT memory requests, with these addresses defining the reserved portion 122 of memory 120. A second, non-overlapping range of physical addresses in memory 120 define the shared portion 124, which may be used to store both RT and NRT memory requests. Although not explicitly shown here, processor 101 may include various structures, such as a translation lookaside buffer (TLB), which provides translations between virtual memory addresses and physical memory addresses.

Configuration registers 106 in the embodiment shown are also configured to store information indicative of the portion of buffers 103 that comprises the reserved portion 113. The information stored may be in accordance with an addressing scheme used by the particular buffer. Any suitable type of storage circuitry may be used to implement configuration registers 106.

Processor 101 in the embodiment shown is configured to designate certain memory requests as RT memory requests in response to detecting that a physical address of the memory request falls within the reserved portion 122. For example, if load/store circuit 105 carries out a load instruction that targets data stored in the reserved portion 122 of memory 120, as indicated by a physical address, the request is designated as an RT request if not otherwise already carrying the designation. In various embodiments, processor 101 may use various mechanisms to indicate that a particular request is an RT request. For example, an embodiment is contemplated in which a memory request includes a number of different fields, including a payload field (containing the requested data or instructions), a source field, a destination field, and a request type field. The request type field in this example is used to designate the particular request as being an RT request or an NRT request. The field may be as small as a single bit, with the bit being set to indicate that a request is an RT request, and being reset to indicate that it is an NRT request.

It is noted that the partitions between the reserved and shared portions of the resources shown in FIG. 1 are not hard partitions. That is, buffers 103 and memory 120 may include contiguous ranges of storage locations in accordance with their respective addressing schemes. The partition between the reserved and shared portions is thus defined by the information stored in configuration registers 106. This information may be programmed into configuration registers 106 at, e.g., system start-up or some other time. In some embodiments, the particular ranges may be hardwired into configuration registers 106 by, e.g., blowing fuses or another suitable mechanism. The information may be read from configuration registers 106 by various circuit units in processor 101, including the load/store circuit 105 as shown here.

The use of the configuration registers 106 to indicate which portions are reserved may enable software to identify regions of memory and the various other resources, such as buffers 103, that are used to store information for which RT service is required. For example, an interrupt service routine (ISR) may carry out a number of memory requests during execution, while the fetching of the ISR itself from memory 120 may also comprise one or more RT transactions. Accordingly, the ISR and pertinent information may be stored in reserved portions of memory 120, based on software instructions programmed into these routines, such that memory requests related thereto are treated as RT requests and thus allow the servicing of corresponding interrupt requests within a prescribed latency. Other types of software for which certain transactions have strict latency requirements may also utilize the reserved portions and may thus receive RT service for correspondingly designated memory requests during execution.

Figure 2:
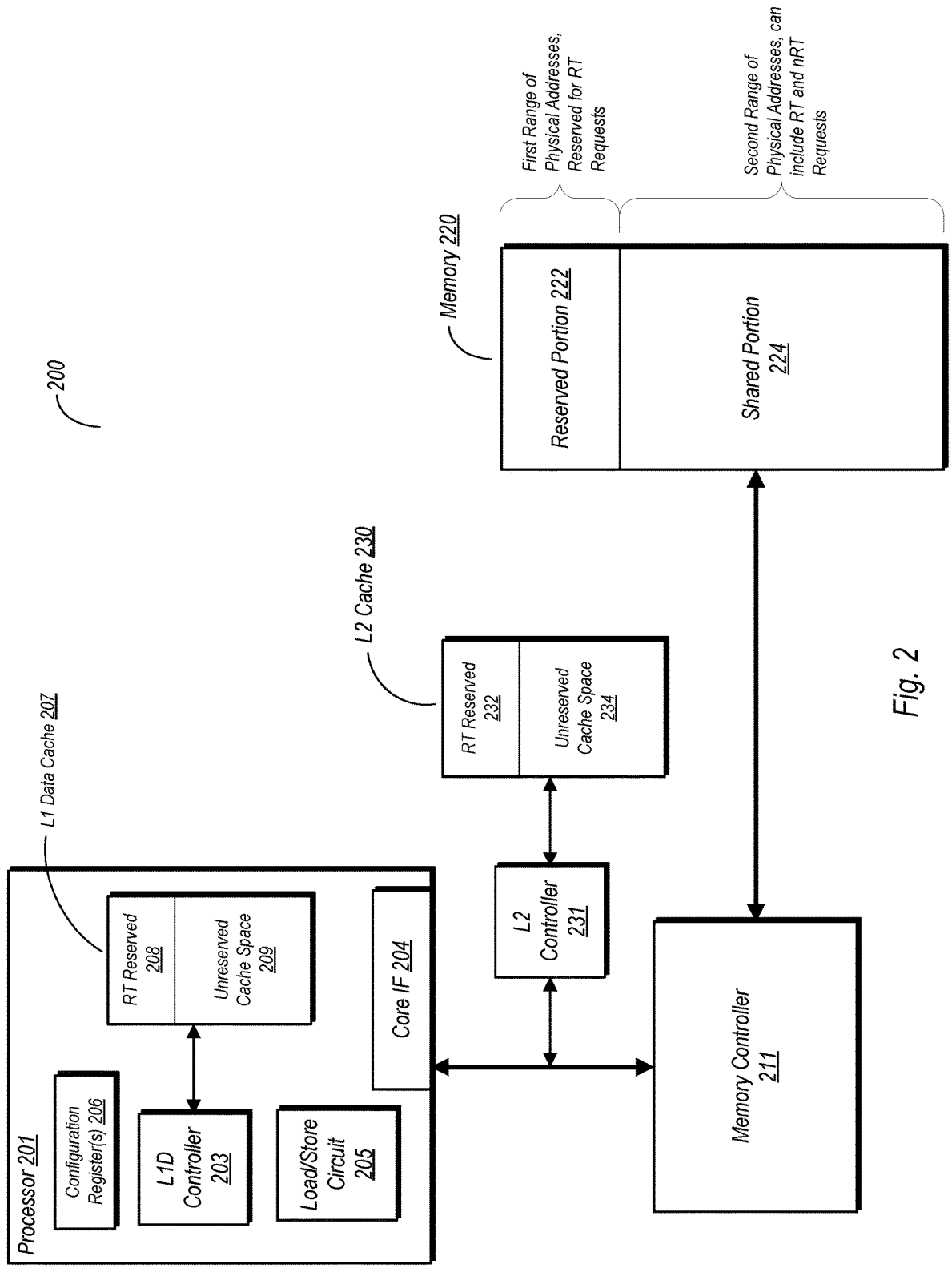
FIG. 2 is a block diagram of another embodiment of a system including a processor and a memory.

FIG. 2 is a block diagram of another embodiment of a system including a processor and a memory. In the embodiment shown, processor 201 includes configuration registers 206 and a load store circuit 205, which may function in a manner similar to their counterparts discussed above with reference to FIG. 1. Processor 201 also includes a level one (L1) data cache 207, an L1 data cache controller 203, and a core interface 204. L1 data cache 207 in the embodiment shown includes a reserved portion 208 that is used exclusively for RT memory requests, as well as a unreserved portion 209 that may be shared between RT and NRT memory requests. L1 data cache controller 203 in the embodiment shown comprises circuitry used to manage the cache memory space of L1 data cache 202, and may define the portion of L1 data cache 202 that comprises the reserved portion, and in one embodiment, may do so using information stored in configuration registers 206. It is noted that the reserving of space for RT memory requests in L1 data cache 207 (as well as other caches discussed below) is optional, and embodiments that do not reserve space for RT memory requests in an cache are possible and contemplated.

Although not explicitly shown here, processor 201 may also include an L1 instruction cache and corresponding controller. Various embodiments of processor 201 may also include appropriate execution circuits/units, registers, address translation circuits, instruction fetch and dispatch circuits, dependency checking circuits, and so on.

System 200 in the embodiment shown also includes a memory controller 211, a memory 220, a level two (L2) cache 230, and an L2 cache controller 231. L2 cache 230 in the embodiment shown may store both data and instructions, and includes a reserved portion 232 which is used exclusively for RT memory requests, as well as an unreserved portion 234, which may be shared between RT and NRT memory requests. L2 cache controller 231 in the embodiment shown may manage the cache memory space in L2 cache 230, and this may include defining the reserved portion 232 in L2 cache 230. In some embodiments, L2 cache controller 231 may utilize information received from configuration registers 206 in order to determine which spaces in L2 cache 230 are to be reserved.

Memory controller 211 in the embodiment shown is a memory management circuit that manages the memory space of memory 220. In one embodiment, memory 220 is a system memory, and may be shared by a number of different processors and other agents (e.g., peripheral interfaces, graphics processing circuits, and so on). In the embodiment shown, memory controller 211 may utilize the information from configuration registers 206 to determine the reserved portion 222 of memory 220. Similar to the embodiment discussed above, the reserved portion 222 may comprise a first range of physical addresses, with these physical addresses reserved exclusively for RT memory requests. The shared portion 224 may comprise a second range of physical addresses that is non-overlapping with the first. The shared portion may be used to store both RT and NRT memory requests.

Although not explicitly shown here, system 200 may also include a level three (L3) cache and a corresponding cache controller. In some embodiments, the L3 cache may also have a portion reserved for RT memory requests and another portion that may be shared between RT and NRT memory requests. More generally, system 200 may include a last-level cache (LLC) which is a cache level below which the next level in the memory hierarchy is the main system memory.

Although both L1 data cache 207 and L2 cache 230 include portions reserved for RT memory requests, in some instances, L1D cache controller 203 and L2 cache controller 231 may nevertheless designate certain RT requests as un-cacheable in their respective cache memories. For example, if, in an attempt to cache a particular RT memory request in L1 data cache 207 would result in a evicting a potential victim that is a dirty cache line, the RT memory request may be designated as uncacheable in the L1 data cache 207. This is due to the fact that the dirty cache line that is the potential victim requires writeback to main memory before it can be evicted. The writeback process can consume a significant amount of time, and this delay can exceed the latency requirements for the particular RT memory request. Thus, instead of caching the particular RT memory request in the L1 data cache, an attempt is made to cache the memory request in the L2 cache 230. Since the L2 cache 230 is larger than an L1 cache, the chances of either having the desired space in the reserved portion 232 or finding a non-dirty victim cache line in the unreserved portion 234 are greater. This increases the likelihood that the particular memory request can be stored in the L2 cache 230.

A particular RT memory request may also be designated as uncacheable if the amount of reserved space used in certain buffers or other resources is low. These resources are discussed in further detail below with reference to FIG. 3.

Generally speaking, the storing of RT memory requests in a particular resource may first include attempts to store the request in a shared portion of that resource. If space is unavailable in the shared portions, the reserved portions may then be used. In the case of a cache memory as described above, a cache line may be evicted from the shared portion if it is not a dirty cache line. Otherwise, if the potential victim is dirty and space in the reserved portion exceeds a particular threshold, the RT memory request is designated as uncacheable in that particular cache, but may be cached in a lower level cache.

Figure 3:
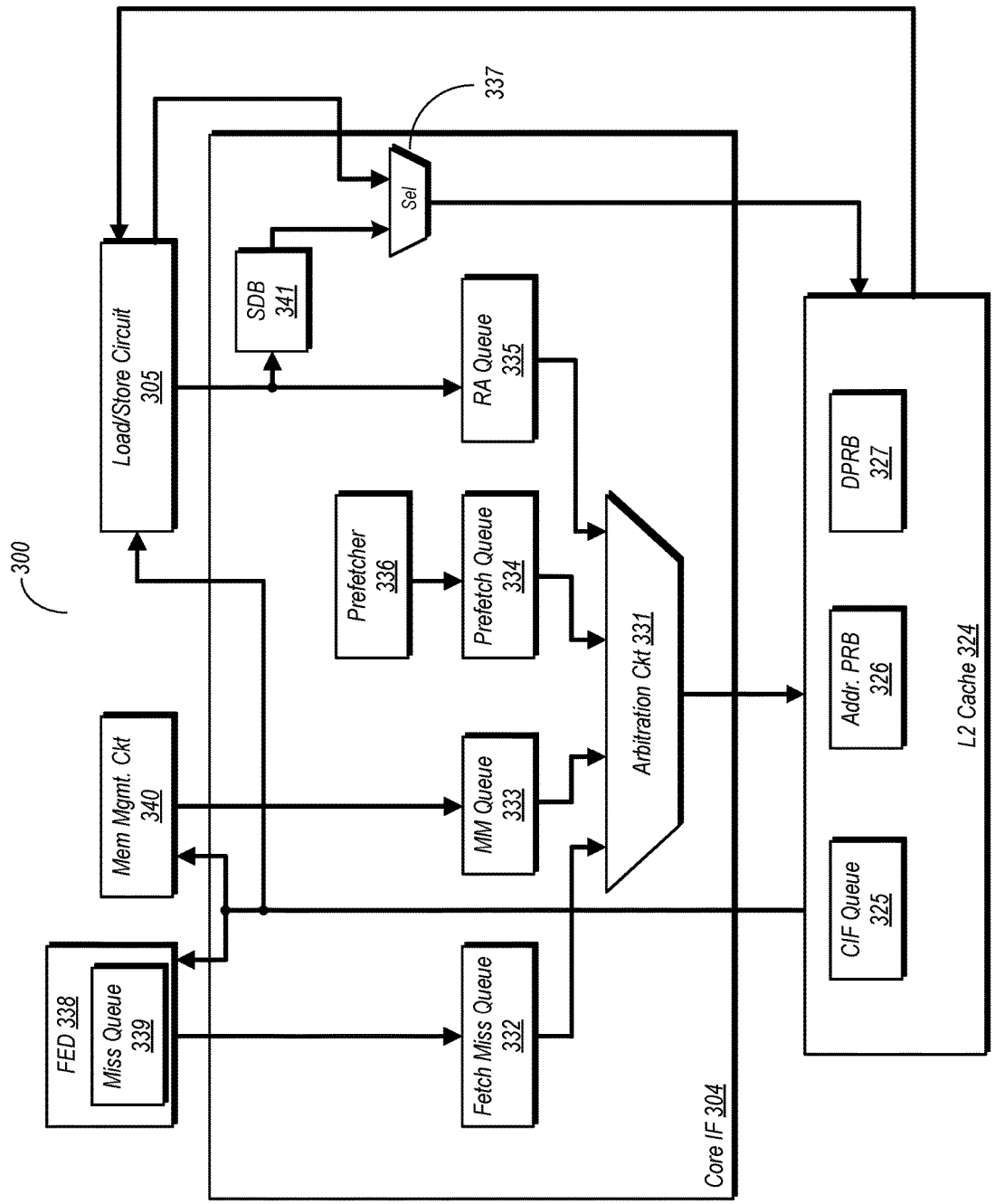
FIG. 3 is a block diagram of a portion of one embodiment of a processor.

Processor Core Interface with Reserved Resource and Arbitration Circuit:

FIG. 3 is a block diagram of a portion of one embodiment of a processor. More particularly, system 300 in the embodiment shown illustrates a core interface of a processor (e.g., similar to that of core interface 204 of FIG. 2) and the various components thereof, along with some additional components.

Core interface circuit 305 in the embodiment shown includes an arbitration circuit 331 that is configured to arbitrate among memory requests from a number of different sources. Arbitration circuit 331 is further configured to prioritize RT memory requests over NRT memory requests, irrespective of the age of the latter. With regard to competing RT memory requests, arbitration circuit 311 may select the oldest of these requests in some embodiments. However, if the latency requirements vary between two competing RT memory requests, some embodiments of arbitration circuit 331 may select a winning request to ensure that latency requirements for both are met irrespective of which one is older.

System 300 includes a number of different storage resources that may include portions that are reserved for RT memory requests. Fetch and decode circuit (FED) 338 in the embodiment shown is configured to fetch and decode instructions into micro-ops to be executed by the processor in which core interface 304 is implemented. FED 338 in the embodiment shown includes a miss queue 339, which includes storage circuitry for storing requests that resulted in a miss in, e.g., an L1 instruction cache. These requests may be forwarded to fetch miss queue 332, which includes storage circuitry in which these requests may be stored until selected by arbitration circuit 331. Both miss queue 339 and fetch miss queue 332 may include portions that are reserved for RT memory requests, with other portions being shared.

Memory management circuit 340 in the embodiment shown may also generate memory requests, which may be RT or NRT memory requests. These requests may be forwarded to a memory management queue 333, which comprises storage circuitry that stores the memory requests generated by memory management circuit 340.

Core interface circuit 336 also includes a prefetcher 336, which comprises circuitry configured to generate prefetch requests in accordance with a prefetch algorithm (such as stride prefetching). The prefetch requests, which can include both RT memory requests and NRT memory requests, are forwarded to storage circuitry in prefetch queue 334, where they are stored until selected by arbitration circuit 334.

Load/store circuit 305 in the embodiment shown may also generate memory requests, both RT and NRT. Addresses associated with these requests may be forwarded to storage circuitry in read address queue 335, where they may be stored until selected by arbitration circuit 331. For store instructions, a store data buffer (SDB) 341 is provided with storage circuitry to store data associated with the corresponding memory request. This data may be forwarded to L2 cache 324 upon selection of a corresponding memory request by arbitration circuit 331 from request address queue 335. The data from SDB 341 may be routed through selection circuit 337. A second input to selection circuit 337 is provided directly from load/store circuit 305 for writeback of cache victims (e.g., from an L1 cache in the processor).

L2 cache 324 in the embodiment shown includes a core interface queue 325, an address pending request buffer (APRB) 326, and a data pending request buffer (DPRB) 327. Core interface queue 325 may store memory requests that are to be provided from L2 cache 324 back to the processor, e.g., in response to execution of load instructions by load/store circuit 305. In the case of requests that involve instructions from a fetch, the requests are provided from core interface queue 325 to FED 338, where they may be decoded into micro-ops that are subsequently executed within the processor. Requests comprising data may be forwarded from core interface queue 325 to memory management circuit 340 and load/store circuit 305, and may subsequently be forwarded to registers to be used as operands in the execution of certain instructions. Address pending request buffer (PRB) 326 may store requests that have initiated bus activity, with their corresponding data being stored in DPRB 327.

The various storage circuits shown in core interface 304 as well as miss queue 339 may each have a number of different entries, some of which may be reserved for RT memory requests. The reserved portions may be indicated by, e.g., configuration registers such as those discussed above with reference to the embodiments of FIGS. 1 and 2. The configuration registers may also be used by an L2 cache controller to determine entries in the core interface queue 325, PRB 325, and DPRB 327 that may be reserved for RT requests. However, since the L2 cache may be shared by a number of different agents (e.g., other processors), the entries may be further reserved for particular agents. For example, address PRB 326 may include entries reserved for RT requests for each of a number of different processors that have access to the L2 cache 324, and may also provide a number of entries reserved for NRT memory requests. The allocation of entries to various ones of the processors may be determined by an L2 cache controller (such as that shown in FIG. 2), and may use information provided from corresponding sets of configuration registers.

Figure 4:
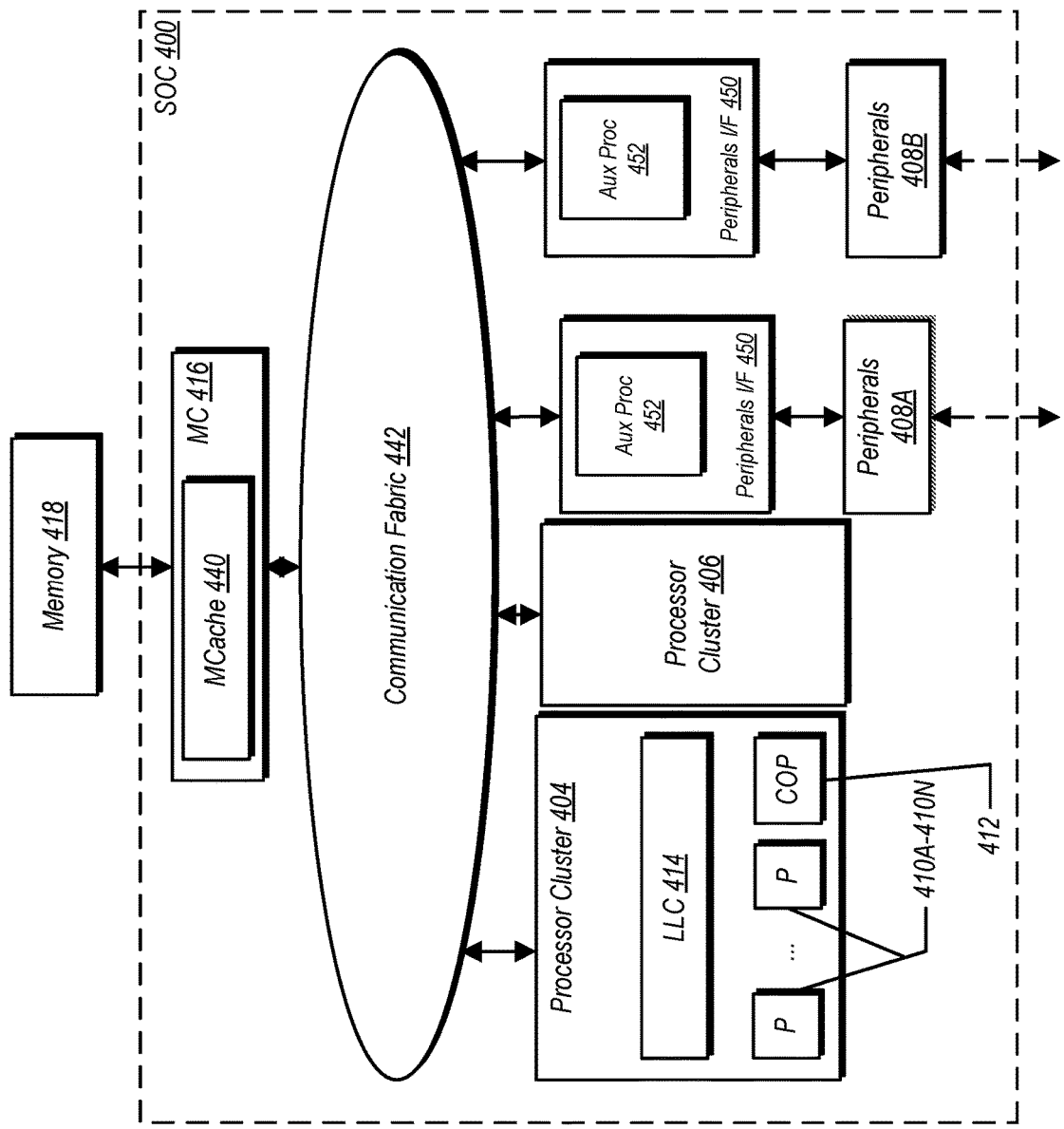
FIG. 4 is a block diagram of one embodiment of a system-on-a-chip (SoC) having multiple processors.

SoC with Multiple Processors:

FIG. 4 is a block diagram of one embodiment of a system that includes a system on a chip (SoC) 400 coupled to a memory 418. As implied by the name, the components of the SoC 400 may be integrated onto a single semiconductor substrate as an integrated circuit "chip." In the illustrated embodiment, the components of the SoC 400 include a processor cluster 404, another processor cluster 406, and a number of peripheral interfaces 450 that are coupled to corresponding ones of peripherals 408. The peripheral interfaces 450 in this embodiment each include an auxiliary processor 452, which may implement a processor in accordance with the discussion of the embodiments of FIGS. 1-3, and may carry out operations such as those discussed in reference to the method embodiments of FIGS. 5-7. SoC 400 also includes a memory controller 416 and a memory cache 440, and is configured to be coupled to a memory 418. In some embodiments, there may be more than one memory controller coupled to a corresponding memory. The memory address space may be mapped across the memory controllers in any desired fashion in such embodiments. A communications fabric 442 is provided to enable communications between the various processor clusters 404, peripheral interfaces 450, and memory controller 416, and thus the components implemented within each.

In the illustrated embodiment, the processor cluster 404 may include a plurality of processors (P) 410A-410N. The processors 410A-410N may form the central processing units (CPU(s)) of the SoC 400. In some embodiments, these processors may be heterogenous with respect to one another, with some processors optimized for high performance while others may be optimized for efficient power usage. However, embodiments with a homogenous group of processors within one of the processor clusters are possible and contemplated. The processor cluster 404 may further include one or more coprocessors (e.g., the coprocessor 412 in FIG. 4). The processor cluster 404 may further include lower level caches 414 (e.g., an L2 or L3 cache). The processor cluster 406 may be similar to the processor cluster 404.

The memory controller 416 may generally include the circuitry for receiving memory operations from the other components of the SoC 400 and for accessing the memory 18 to complete the memory operations. The memory controller 416 may be configured to access any type of memory 418. For example, the memory 418 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 416 may include queues for memory operations, for ordering (and potentially reordering) the operations and presenting the operations to the memory 418. The memory controller 416 may further include data buffers to store write data awaiting write to memory and read data awaiting return to the source of the memory operation. In some embodiments, the memory controller 16 may include a memory cache (MCache) 440 to store recently accessed memory data. In SoC implementations, for example, the MCache 440 may reduce power consumption in the SoC by avoiding reaccess of data from the memory 418 if it is expected to be accessed again soon. In some cases, the MCache 440 may also be referred to as a system cache, as opposed to private caches such as the LLC 414 or caches in the processors 410A-410N, which serve only certain components. Additionally, in some embodiments, a system cache need not be located within the memory controller 416.

The peripherals 408A-408B may be any set of additional hardware functionality included in the SoC 400. For example, the peripherals 408A-408B may include video peripherals such as one or more graphics processing units (GPUs), an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. Communication between peripherals 408A and 408B may be facilitated by correspondingly coupled instances of peripheral interfaces 450. These peripheral interfaces may be configured to control various peripheral interface types such as Universal Serial Bus (USB), peripheral component interconnect (PCI) including PCI Express (PCIe), serial and parallel ports, and so on. The peripherals may also include networking peripherals such as media access controllers (MACs) as well. The auxiliary processors 452 in the interface controllers 450 may carry out various control functions for facilitating communications between correspondingly coupled peripherals and other portions of SoC 400. Auxiliary processors 452 may also carry out various functions such as handling interrupt requests generated by the peripherals coupled to their respective ones of peripheral interfaces 450.

The communication fabric 412 may be any communication interconnect and protocol for communicating among the components of the SoC 400. The communication fabric 312 may be bus-based, including shared bus configurations, cross bar configurations, and hierarchical buses with bridges. The communication fabric 412 may also be packet-based, and may be hierarchical with bridges, cross bar, point-to-point, or other types of interconnection circuitry.

It is noted that the number of components of the SoC 400 (and the number of subcomponents for those shown in FIG. 4, such as the processors 410A-410N in each processor cluster 404 and 406 may vary from embodiment to embodiment. Additionally, the number of processors 410A-410N in one processor cluster 404 may differ from the number of processors 410A-410N in the other processor cluster 406. There may be more or fewer of each component/subcomponent than the number shown in FIG. 4.

Figure 5:
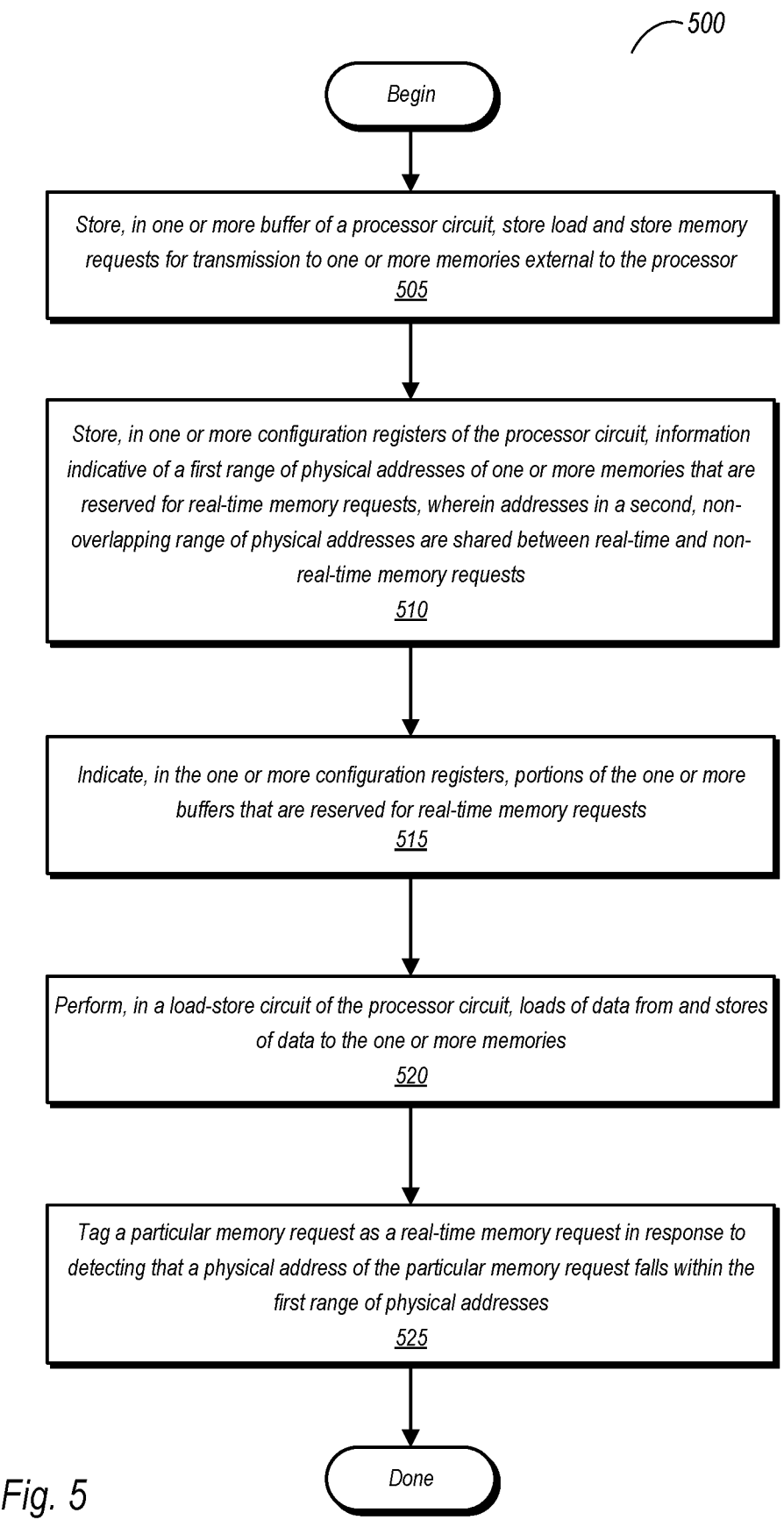
FIG. 5 is a flow diagram of one embodiment of a method for operating a processor.

Methods for Operating a Processor:

FIG. 5 is a flow diagram of one embodiment of a method for operating a processor. Method 500 as discussed herein may be carried out by any of the hardware embodiments discussed elsewhere herein. Hardware embodiments not explicitly disclosed herein but otherwise capable of carrying out Method 500 are also considered to fall within the scope of this disclosure.

Method 500 includes storing, in one or more buffers of a processor circuit, load and store memory requests for transmission to one or more memories external to the processor (block 505). The method further includes storing, in one or more configuration registers of the processor circuit, information indicative of a first range of physical addresses of one or more memories that are reserved for real-time memory requests, wherein addresses in a second, non-overlapping range of physical addresses are shared between real-time and non-real-time memory requests (block 510), and indicating, in the one or more configuration registers, portions of the one or more buffers that are reserved for real-time memory requests (block 515). In various embodiments, Method 500 also include performing, in a load-store circuit of the processor circuit, loads of data from and stores of data to the one or more memories (block 520) and tagging a particular memory request as a real-time memory request in response to detecting that a physical address of the particular memory request falls within the first range of physical addresses (block 525).

In various embodiments, the method includes designating portions of one or more cache memories that are reserved for real-time memory requests and designating a particular real-time request as non-cacheable in a particular cache memory in response to determining that a number of entries occupied in at least one of the one or more buffers exceeds a threshold value. Some embodiments include designating portions of one or more cache memories that are reserved for real-time memory requests, and may also include designating a particular real-time request as non-cacheable in a particular cache memory in response to determining that a non-real time victim of the real-time memory request is a dirty cache line.

Various embodiments of the method are contemplated that include arbitrating, using an arbitration circuit, among a plurality of memory requests, wherein the arbitrating includes advancing a particular real-time memory request over an older non-real-time memory request. Such embodiments may also include outputting requests from the arbitration circuit to at least one cache memory.

Embodiments of the method may also include reserving, in ones of the one or more buffers, one or more reserved storage locations of a first portion for real-time memory requests. The method can also include sharing, in the ones of the one or more buffers, a plurality of shared storage locations for real-time memory requests and non-real-time memory requests. In response to determining one of the shared storage locations is available, the method includes placing a given real-time memory request in the second portion. If none of the plurality of shared storage locations are available, the method includes placing the given real-time memory request in the first portion.

One possible use case for the various embodiments of RT processing per the present disclosure includes the handling of interrupts. Accordingly, embodiments are possible and contemplated that include executing, using the processor circuit, an interrupt handler in response to an interrupt. These embodiments may also include designating memory requests associated with the interrupt handler as real-time memory requests.

Figure 6:
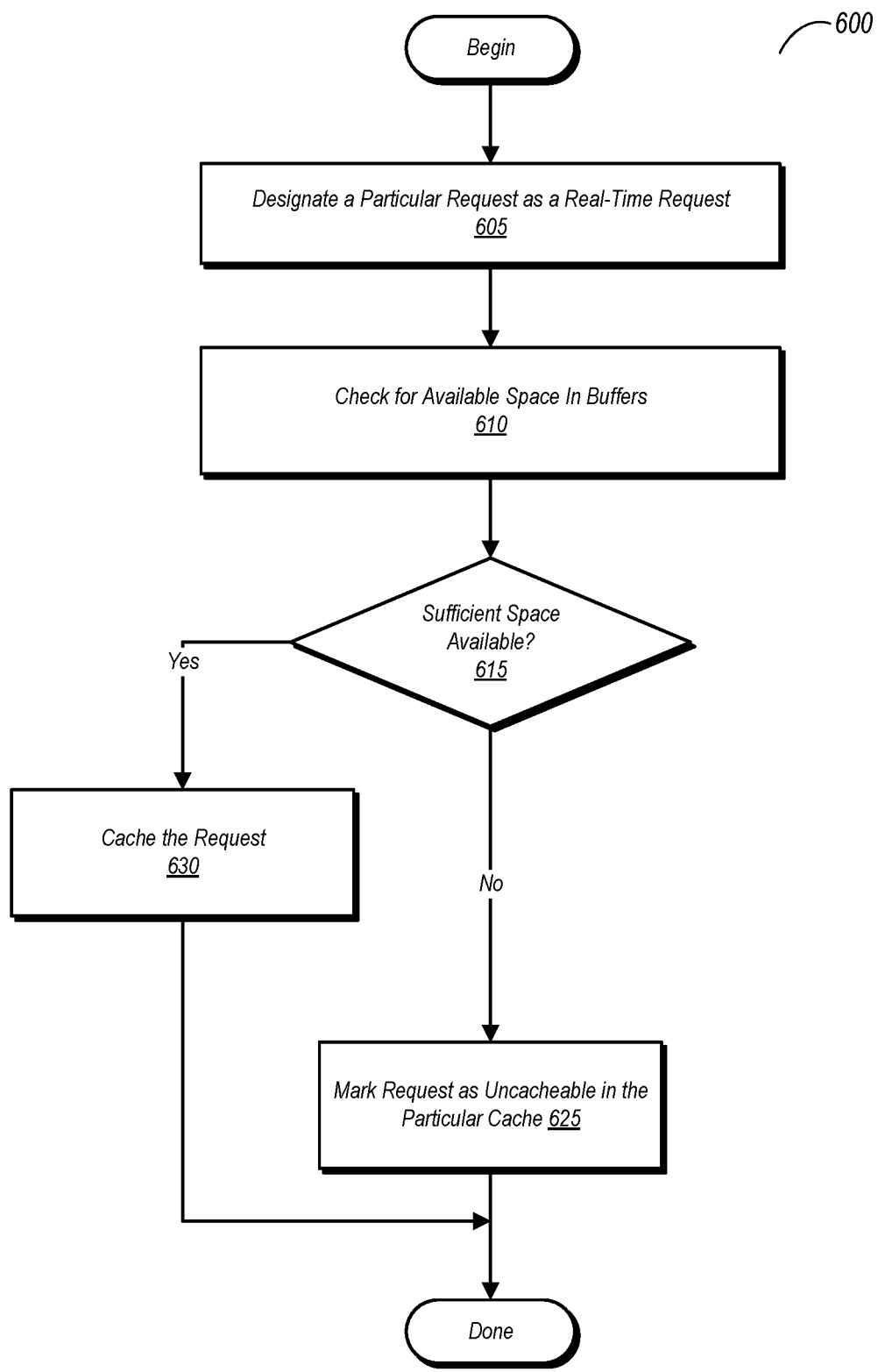
FIG. 6 is a flow diagram of another embodiment of a method for operating a processor.

FIG. 6 is a block diagram of another embodiment of operating a processor in accordance with the present disclosure. Method 600 may be carried out by any of the hardware embodiments discussed elsewhere herein. Hardware embodiments not explicitly discussed herein, but capable of carrying out Method 600, are considered to fall within the scope of this disclosure.

Method 600 illustrates an embodiment of a method in which an RT memory request is a candidate to be cached. The method begins with designating a particular memory request as an RT request (block 605). Thereafter, the method may include checking the various buffers for available space to provide temporary storage the RT request (block 610).

If sufficient space is not available in the various buffers (block 615, no), the request is marked as uncacheable (block 625). This is due to the fact that a potential eviction of an NRT request would be unable to be stored in one of the buffers, and would thus require writeback to memory. If it is determined that sufficient space is available in the buffers (block 615, yes), the RT request may be cached in a particular cache (block 630).

Using Method 600 may prevent delays that could result from having to write back a potential victim to memory. The writeback process for a NRT request may consume a significant amount of time, and this time may exceed the latency of simply accessing the RT request from dedicated resources in system memory or caching the RT request in a lower level cache (e.g., an L3 cache instead of an L1 or L2). The time required for writeback can also potentially exceed the latency requirements for carrying out a particular RT request, such as one that is related to interrupt handling. Thus, it may be more efficient to simply carry out the RT request from dedicated resources in system memory rather than waiting for a writeback of an NRT request to complete.

Figure 7:
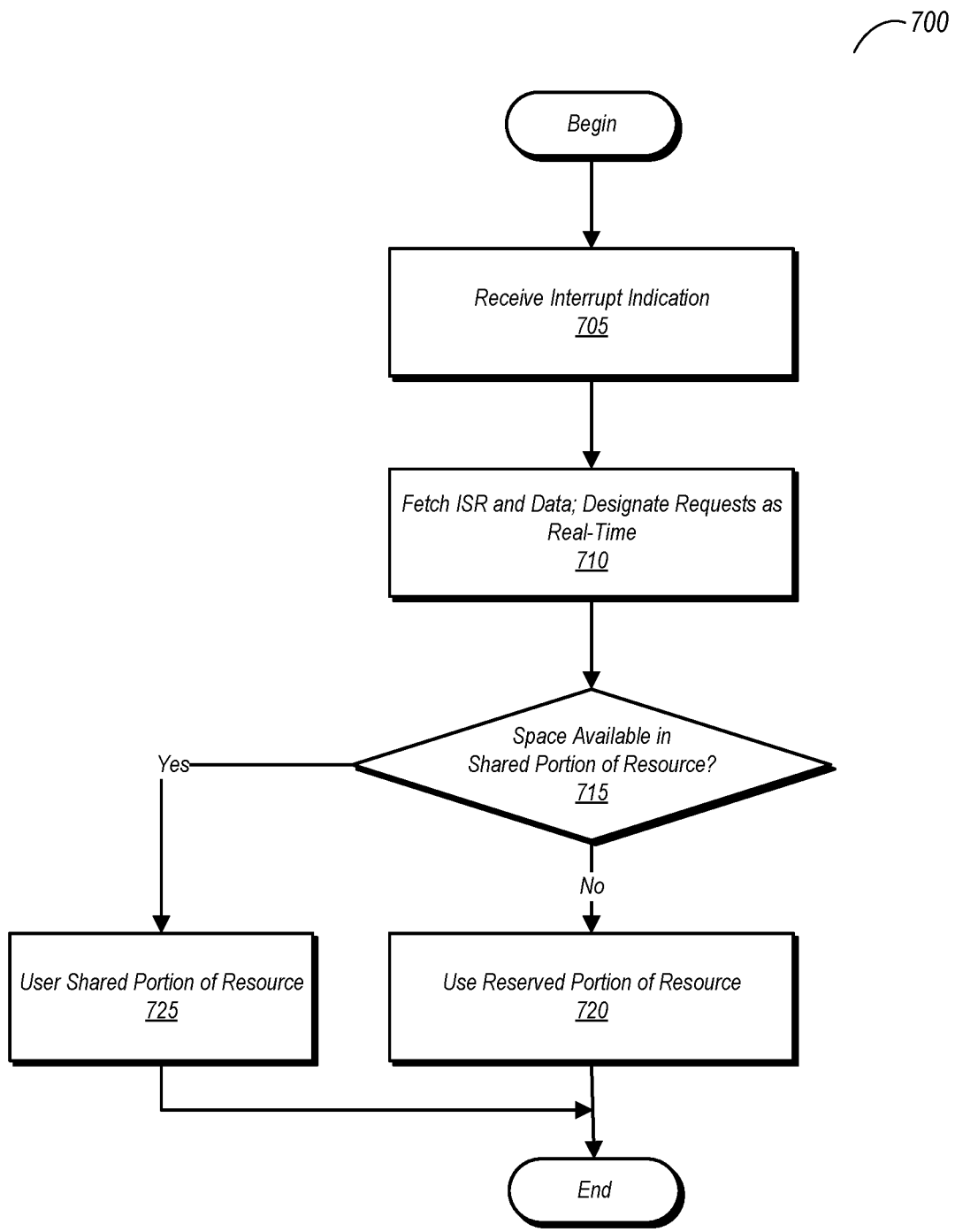
FIG. 7 is a flow diagram of another embodiment of a method for operating a processor.

FIG. 7 is a flow diagram of another embodiment of operating a processor in accordance with the present disclosure. Method 700 may be carried out by any of the hardware embodiments discussed elsewhere herein. Hardware embodiments not explicitly discussed herein, but capable of carrying out Method 700, are considered to fall within the scope of this disclosure Method 700 is related to the use case of executing an interrupt handler, as well as that of deciding whether to use shared or reserved resources for a particular RT memory request. It is noted however that the use case of an interrupt handler is provided by way of example and is thus not intended to be limiting. The decision as to whether to use shared or reserved resources may, in various embodiments, be applied to any RT memory request, irrespective of whether it is interrupt-related or not.

Method 700 includes receiving an indication of an interrupt (block 705). This indication may be received in the form of an interrupt request. For example, if the processor is an auxiliary processor that is part of a peripheral interface (e.g., such as the auxiliary processors 452 of FIG. 4), a peripheral coupled to the interface may assert an interrupt request. One example of this is the use of a touch screen as a peripheral. When a user touches the touch screen, an interrupt request may be generated and provided to the processor in order to enable a proper response to the touch.

After receiving the indication of the interrupt, the processor may fetch an appropriate interrupt service routine (ISR) and corresponding data, with memory requests based on the data being designated as RT requests (block 710). Upon designating the request as being an RT request, the request may be eligible to use various resources reserved to RT requests, but may also use resources that are shared between RT and NRT requests. Such resources may include any of those discussed above, such main memory, cache space, various buffers and queues, and so on. When determining if the RT request is to be stored in a particular resource, Method 700 includes determining if space is available in a shared portion of the resource. If shared space is available (block 715, yes), then the RT request is stored within that shared space of the particular resource. If no shared space is available (block 715, no), then the RT request is stored in the reserved portion of the particular resource.

Generally speaking, Method 700 contemplates the use of shared resources when available for use to handle RT requests. The reserved portions may be used for RT requests during times of heavy system activity when no shared resources are available. Given that RT requests are processed faster than NRT requests, this may allow for RT requests to have space available in at least the reserved portions in most, if not all instances.

Figure 8:
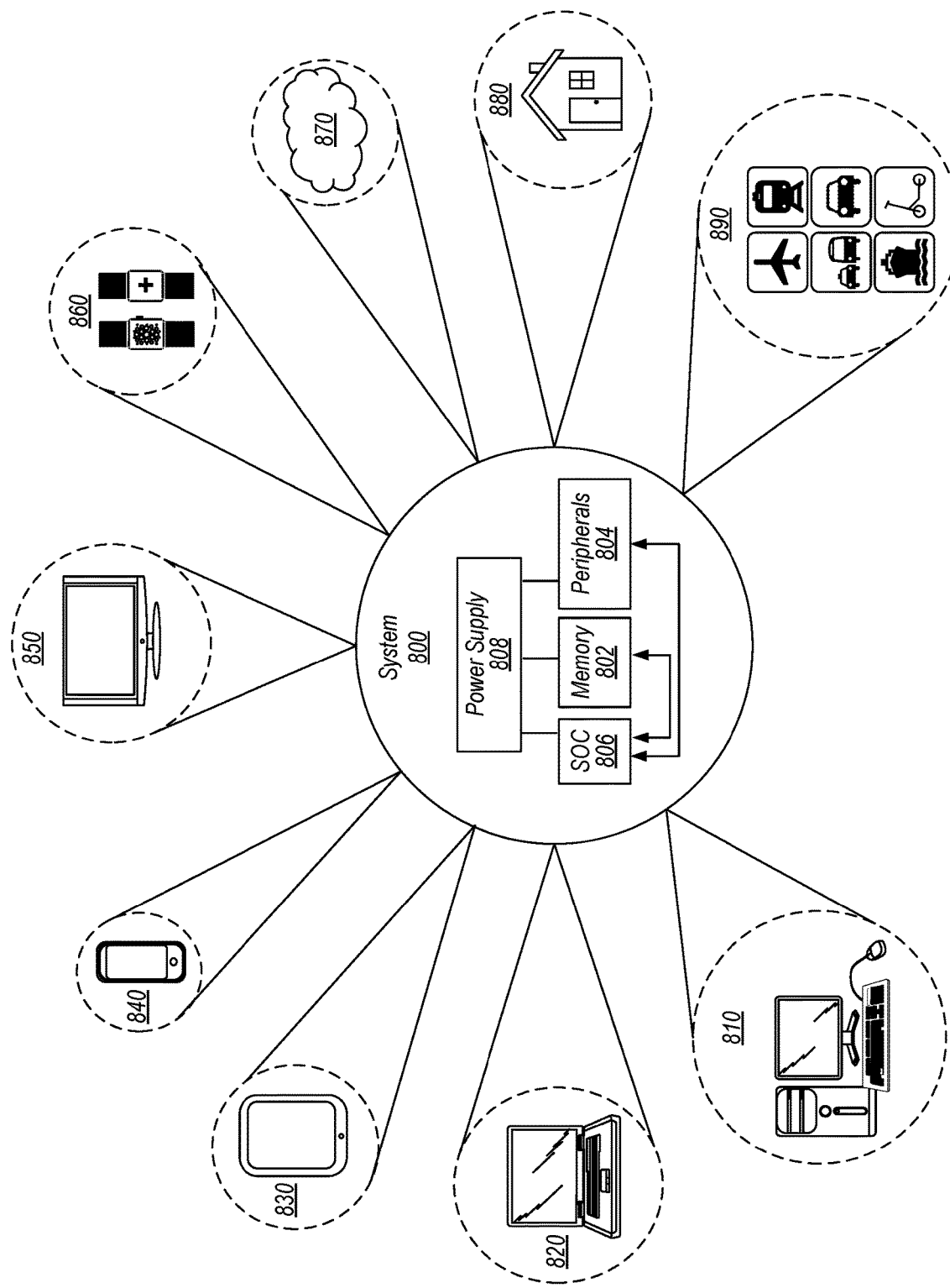
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include various processors and resources such as those discussed above in reference to FIGS. 1-7. For example, SoC 806 may include a number of peripheral interfaces that include respective auxiliary processors as described above and which reserve various portions of certain resources (e.g., physical address ranges of system memory, portions of various buffers, etc.). Such processors may be configured to handle RT memory transactions and NRT memory transactions as described, and do so without separate, duplicate resources and other mechanisms that implement hard partitions.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to," An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor circuit including:
      a load-store circuit configured to perform loads of data from and stores of data to one or more memories external to the processor;
      one or more buffers configured to store load and store memory requests for transmission to the one or more memories; and
      one or more configuration registers configured to store information indicative of a first range of physical addresses of the one or more memories that are reserved for real-time memory requests, wherein addresses in a second, non-overlapping range of physical addresses are shared between real-time and non-real-time memory requests, wherein the configuration registers are further configured to indicate portions of the one or more buffers that are reserved for real-time memory requests;
      wherein the processor circuit is configured to tag a particular memory access request as a real-time memory request in response to detecting that a physical address of the particular memory request falls within the first range of physical addresses.

2. The apparatus of claim 1, wherein the configuration registers are further configured to indicate portions of one or more buffers that are reserved for real-time memory requests.

3. The apparatus of claim 2, further comprising a memory management circuit configured to designate a portion of a level one (L1) cache as reserved for real-time memory requests, and further configured to designate a particular real-time memory request as non-cacheable in the L1 cache in response to determining that a number of occupied entries in at least one of the one or more buffers exceeds a threshold.

4. The apparatus of claim 1, further comprising a memory management circuit configured to designate a real-time memory request as being non-cacheable in a particular cache memory in response to determining that a non-real time victim of the real-time memory request is a dirty cache line.

5. The apparatus of claim 4, wherein the memory management circuit is configured to cause caching of the real-time memory request in a cache in a lower level than the particular cache memory in response to the real-time memory request being designated as non-cacheable in the particular cache memory.

6. The apparatus of claim 1, wherein the processor includes an arbitration circuit configured to advance a particular real-time memory request over an older non-real-time memory request.

7. The apparatus of claim 6, wherein the arbitration circuit is configured to arbitrate memory requests from the one or more buffers and the load-store circuit, wherein the one or more buffers include a pending request buffer configured to store information for pending memory requests, and a pending request data buffer configured to store data associated with ones of the pending memory requests stored in the pending request buffer.

8. The apparatus of claim 6, wherein the arbitration circuit is configured to output memory requests to at least one cache memory.

9. The apparatus of claim 1, wherein the processor circuit is configured to execute an interrupt handler in response to an interrupt, and wherein the processor circuit is configured to designate memory requests by the interrupt handler as real-time memory requests.

10. The apparatus of claim 1, wherein the processor circuit is configured to place a given real-time memory request in shared portions in a given one of the one or more buffers if space is available in the shared portions, and further configured to place the given real-time memory request in a portion of a given buffer that is reserved for real-time memory requests if there is no space available in the shared portions.

11. A method comprising:
storing, in one or more buffers of a processor circuit, load and store memory requests for transmission to one or more memories external to the processor;
storing, in one or more configuration registers of the processor circuit, information indicative of a first range of physical addresses of one or more memories that are reserved for real-time memory requests, wherein addresses in a second, non-overlapping range of physical addresses are shared between real-time and non-real-time memory requests;
indicating, in the one or more configuration registers, portions of the one or more buffers that are reserved for real-time memory requests;
performing, in a load-store circuit of the processor circuit, loads of data from and stores of data to the one or more memories; and
tagging a particular memory request as a real-time memory request in response to detecting that a physical address of the particular memory request falls within the first range of physical addresses.

12. The method of claim 11, further comprising:
designating portions of one or more cache memories that are reserved for real-time memory requests; and
designating a particular real-time request as non-cacheable in a particular cache memory in response to determining that a number of entries occupied in at least one of the one or more buffers exceeds a threshold value.

13. The method of claim 11, further comprising:
designating portions of one or more cache memories that are reserved for real-time memory requests; and
designating a particular real-time request as non-cacheable in a particular cache memory in response to determining that a non-real time victim of the real-time memory request is a dirty cache line.

14. The method of claim 11, further comprising:
arbitrating, using an arbitration circuit, among a plurality of memory requests, wherein the arbitrating includes advancing a particular real-time memory request over an older non-real-time memory request; and
outputting requests from the arbitration circuit to at least one cache memory.

15. The method of claim 11, further comprising:
reserving, in ones of the one or more buffers, one or more reserved storage locations of a first portion for real-time memory requests;
sharing, in the ones of the one or more buffers, a plurality of shared storage locations for real-time memory requests and non-real-time memory requests;
placing a given real-time memory request in a second portion in response to determining one of the shared storage locations is available; and
placing the given real-time memory request in the first portion if none of the plurality of shared storage locations are available.

16. The method of claim 11, further comprising:
executing, using the processor circuit, an interrupt handler in response to an interrupt; and
designating memory requests associated with the interrupt handler as real-time memory requests.

17. A system comprising:
a system-on-a-chip (SoC), wherein the SoC includes:
one or more general-purpose processing circuits;
a memory controller circuit configured to communicate with a memory coupled to the SoC;
an interface circuit having an auxiliary processor circuit, the auxiliary processor circuit including:
a load-store circuit configured to perform loads of data from and stores of data to the memory;
one or more buffers configured to store memory requests for transmission to the memory controller; and
one or more configuration registers configured to store information indicating a first range of physical addresses of the memory that are reserved for real-time memory requests, wherein addresses in a second, non-overlapping range of physical addresses are shared between real-time and non-real-time memory requests, and wherein the one or more configuration registers are further configured to store information indicating portions of the one or more buffers reserved for real-time memory requests;
wherein the auxiliary processor circuit is configured to, in response to detecting that a physical address of particular memory request is in the first range of physical addresses, tag the particular memory request as a real-time memory request; and a communications fabric comprising circuitry configured to facilitate communications between the one or more general-purpose processing circuits the memory controller, and the auxiliary processor.

18. The system of claim 17, wherein the SoC further includes a plurality of cache memories, including at least one cache implemented in the auxiliary processor circuit, wherein the configuration registers are further configured indicate portions of ones of the plurality of cache memories that are reserved for real-time memory requests.

19. The system of claim 18, wherein the auxiliary processor circuit includes a memory management circuit, wherein the memory management circuit is configured to designated a particular real-time memory request as uncacheable in a particular one of the plurality of cache memories in response to determining that a victim cache line of the real-time memory request is a dirty cache line.

20. The system of claim 17, wherein the auxiliary processor circuit includes an arbitration circuit, wherein the arbitration circuit is configured to arbitrate among a plurality of memory requests stored in the load-store circuit and the one or more buffer circuits, and further configured to select a real-time memory request over an older non-real-time memory request.

* * * * *